(12) United States Patent
O'Neill

(10) Patent No.: US 10,854,901 B2
(45) Date of Patent: *Dec. 1, 2020

(54) REGULATION OF A FUEL CELL ASSEMBLY

(71) Applicant: Hamilton Sundstrand Corporation, Charlotte, NC (US)

(72) Inventor: Jonathan Daniel O'Neill, Manchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 231 days.

This patent is subject to a terminal disclaimer.

(21) Appl. No.: 16/034,441

(22) Filed: Jul. 13, 2018

(65) Prior Publication Data

US 2018/0323455 A1 Nov. 8, 2018

Related U.S. Application Data

(62) Division of application No. 14/171,811, filed on Feb. 4, 2014, now Pat. No. 10,177,392.

(Continued)

(51) Int. Cl.
*H01M 8/04955* (2016.01)
*H01M 8/04858* (2016.01)
(Continued)

(52) U.S. Cl.
CPC ..... *H01M 8/04955* (2013.01); *H01M 8/0488* (2013.01); *H01M 8/04089* (2013.01); *H01M 8/04494* (2013.01); *H01M 8/04559* (2013.01); *H01M 8/04589* (2013.01); *H01M 8/04753* (2013.01); *H01M 8/04953* (2016.02); *H01M 8/249* (2013.01); *H01M 2250/20* (2013.01); *Y02T 90/40* (2013.01)

(58) Field of Classification Search
CPC ......... H01M 8/04955; H01M 8/04953; H01M 8/04089; H01M 8/04559; H01M 8/04589; H01M 8/04753; H01M 8/0488; H01M 8/0494; H01M 8/249
See application file for complete search history.

(56) References Cited

U.S. PATENT DOCUMENTS 7,038,424 B2 5/2006 Adams et al.
7,390,587 B2 6/2008 Dickman et al.
(Continued)

FOREIGN PATENT DOCUMENTS

JP 2004171880 6/2004
JP 2006179194 7/2006

OTHER PUBLICATIONS

European Search Report for European Application No. 14187531.0 completed Nov. 28, 2014.

*Primary Examiner* — Jimmy Vo
(74) *Attorney, Agent, or Firm* — Carlson, Gaskey & Olds, P.C.

(57) ABSTRACT

A fuel cell assembly according to an exemplary aspect of the present disclosure includes, among other things, a first fuel cell stack in series with a variable resistor and a second fuel cell stack in parallel with the first fuel cell stack and in series with a contactor. A resistance level of the variable resistor is adjusted in response to deactivating the contactor. A method of regulating a fuel cell assembly is also disclosed.

20 Claims, 3 Drawing Sheets

Related U.S. Application Data

(60) Provisional application No. 61/886,110, filed on Oct. 3, 2013.

(51) Int. Cl.
    *H01M 8/04828*     (2016.01)
    *H01M 8/249*     (2016.01)
    *H01M 8/04537*     (2016.01)
    *H01M 8/04746*     (2016.01)
    *H01M 8/04089*     (2016.01)

(56) References Cited

U.S. PATENT DOCUMENTS

| | | |
|---|---|---|
| 10,177,392 B2 | 1/2019 | O'Neill |
| 2003/0111977 A1 | 6/2003 | Pearson |
| 2003/0113594 A1 | 6/2003 | Pearson |
| 2004/0185319 A1 | 9/2004 | Enjoji et al. |
| 2006/0088743 A1 | 4/2006 | Gallagher et al. |
| 2006/0127710 A1 | 6/2006 | Schulte |
| 2011/0200906 A1 | 8/2011 | Wu et al. |
| 2011/0229783 A1* | 9/2011 | Robb ................ H01M 8/04037 429/432 |
| 2013/0011704 A1 | 1/2013 | Horne et al. |

\* cited by examiner

REGULATION OF A FUEL CELL ASSEMBLY

RELATED APPLICATION

This application is a divisional of U.S. patent application Ser. No. 14/171,811, filed Feb. 4, 2014, which claims priority to U.S. Provisional Application No. 61/886,110, filed Oct. 3, 2013.

BACKGROUND

This disclosure generally relates to an electric vehicle. More particularly, this disclosure relates to an electric vehicle including a fuel cell assembly.

In some instances, an electric vehicle may be required to operate in a low power mode for a period of time and a high power mode for a different period of time. For example, the electric vehicle can include a load configured to operate in the low power mode, and an electric motor configured to operate in the high power mode for providing mobility to the electric vehicle. The load can include various electric components such as a communications and sensor payload configured to operate in a predetermined voltage range. Operating the electric components outside of the predetermined voltage range can result in degradation or damage of the components.

Various approaches for providing power in a low power mode and a high power mode within a predetermined voltage range are known in the industry. In one approach, an electric vehicle is provided with a plurality of fuel cell stacks in series. Power conditioning is utilized to meet the voltage requirements of a load when only one of the fuel cell stacks is operated in the low power mode. This power conditioning can introduce inefficiencies in fuel consumption and also increase component packaging requirements and system complexity.

In another approach, two or more fuel cells stacks are arranged in parallel with each other. However, operating fuel cell stacks in parallel can increase the risk of fuel starvation due to stack variability and fuel maldistribution, which may result in fuel cell degradation due to corrosion and other operating conditions.

DETAILED DESCRIPTION

Figure 1:
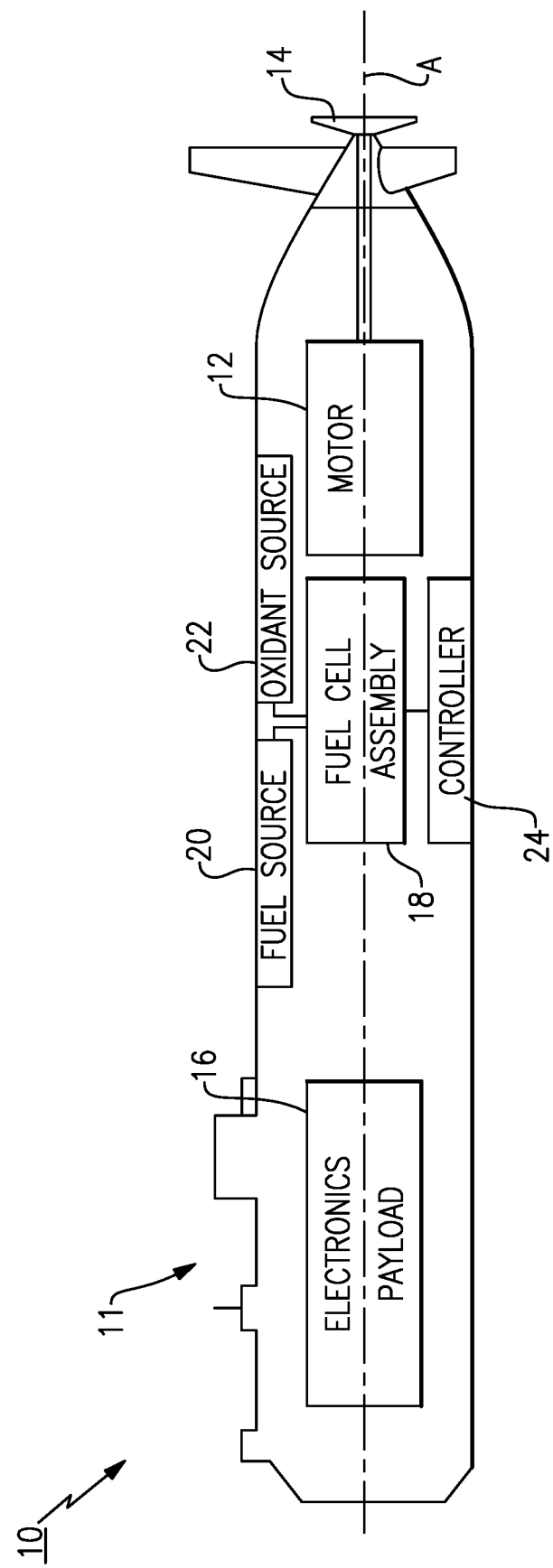
FIG. 1 illustrates a schematic view of an example electric vehicle.

FIG. 1 illustrates a highly schematic side view of an exemplary electric vehicle 10. In one example, the electric vehicle 10 is a Large Displacement Unmanned Underwater Vehicle (LDUUV). In another example, the electric vehicle 10 is a ground based vehicle. However, other electric vehicles and systems are contemplated, including aerial and space systems, manned and unmanned systems, hybrid systems, and stationary systems.

The electric vehicle 10 includes a load 11 including one or more electrical components. In some examples, the load 11 includes an electric motor 12 configured to rotate a propeller 14 about a longitudinal axis A through a body of water. In further examples, the load 11 includes an electronics payload 16. The electronics payload 16 can include communications equipment, one or more sensors, one or more computing devices and other electrical components.

The electric vehicle 10 includes a fuel cell assembly 18 configured to provide power to the load 11. The fuel cell assembly 18 includes a plurality of fuel cells 19 (shown in FIG. 2) for generating power by converting chemical energy into electrical energy. In some examples, each of the fuel cells 19 is a proton exchange membrane (PEM). Other conventional fuel cell arrangements are contemplated, including metal hydride fuel cells, solid oxide fuel cells (SOFC), alkali fuel cells, molten carbonate fuel cells (MCFC) and phosphoric acid fuel cells (PAFC). Additionally, the fuel cells 19 can include the same active area or different active areas to generate different amounts of power. The fuel cell assembly 18 receives fuel or reactant such as hydrogen ($H_2$) from a fuel source 20 and oxidant such as oxygen ($O_2$) or another oxygen containing gas, such as air, from an oxidant source 22. Other fuel types are also contemplated. Additionally, systems deploying other energy sources such as batteries and electrolyzers can benefit from the teachings herein.

In some instances, the electric vehicle 10 operates in a low power mode for a period of time and a high power mode for a different period of time, with power generated by the fuel cell assembly 18. For example, the electric vehicle 10 can operate in the high power mode for a relatively shorter period of time than while operating in the low power mode. The duration of the low power mode and the high power mode can be determined by user requirements and operational conditions of the electric vehicle 10, as well as other considerations.

The fuel cell assembly 18 includes a controller 24 for providing one or more instructions to the fuel cell assembly 18. The controller 24 can include an on-board computer, a microcontroller, one or more digital logic components, or a combination thereof. Other conventional digital computing devices are also contemplated. In other examples, the controller 24 is at least one analog component. In yet other examples, the controller 24 includes a combination of digital and analog components. In further examples, the controller 24 is integrated into the fuel cell assembly 18.

Figure 2:
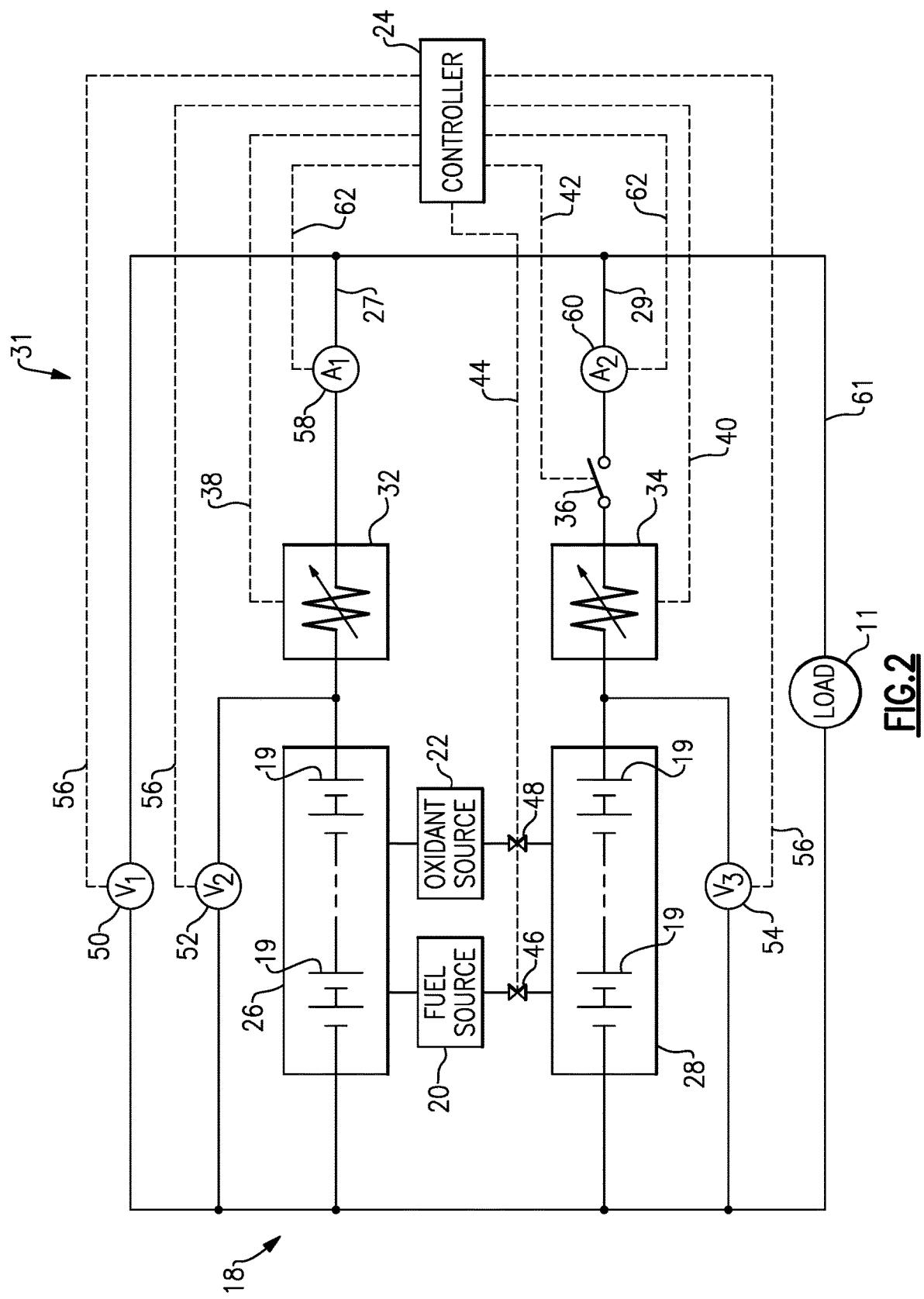
FIG. 2 is a schematic view of an example fuel cell assembly.

Referring to FIG. 2, the fuel cells 19 are arranged into two or more fuel cell stacks. In some examples, the fuel cells 19 of each fuel cell stack are arranged in series with each other. In other examples, the fuel cells 19 of each fuel cell stack are arranged in parallel with each other. As shown, the fuel cells 19 can be arranged as a first fuel cell stack 26 and a second fuel cell stack 28 arranged in parallel with each other to provide power to the load 11 in the low power mode and the high power mode. The first fuel cell stack 26 is electrically coupled to the load 11 via a first path 27 defined by the first fuel cell stack 26, and the second fuel cell stack 28 is electrically coupled to the load 11 via a second path 29 defined by the second fuel cell stack 28. However, the fuel cell assembly 18 can include more than two fuel cell stacks and can also provide power in more than two power levels to the load 11.

The first and second fuel cell stacks 26, 28 are operable to generate a combined high power range in the high power mode of the fuel cell assembly 18, and the first fuel cell stack 26 is operable to generate a low power range in the low power mode of the fuel cell assembly 18. In one example, the low power mode is approximately 0.7 kW, and the high power mode is approximately 37.0 kilowatts (kW), with each of the low and high power modes being at approximately 250.0 volts (V). The first fuel cell stack 26 can be optimized to provide power in the low power mode and the second fuel cell stack 28 can be optimized to provide power in the high power mode. Thus, the power downturn ratio of each of the stacks 26, 28 can be minimized, thereby increasing the overall efficiency of the fuel cell assembly 18.

In some examples, the first fuel cell stack 26 is operable to generate power in a first power range and the second fuel cell stack 28 is operable to generate power in a second power range different from the first power range. The first power range can be less than the second power range. In other examples, the first fuel cell stack 26 and the second fuel cell stack 28 are operable to generate a similar amount of power. The power generated by each of the first fuel cell stack 26 and the second fuel cell stack 28 can be dependent upon the quantity of fuel cells 19 in each of the stacks 26, 28, the active area of each of the fuel cells 19, and other techniques as is known in the art. In further examples, the fuel cell assembly 18 generates power within the low power mode and the high power mode within a single desired voltage range. Operating the electric vehicle 10 within a single desired voltage range can simplify the performance requirements, quantity and overall architecture of the various electrical components of the load 11.

The fuel cell assembly 18 includes a regulation assembly 31 for regulating power provided by the first and second fuel cell stacks 26, 28 to the load 11. The regulation assembly 31 includes a first variable resistor 32 arranged in series with the first fuel cell stack 26. In some examples, the regulation assembly includes a second variable resistor 34 arranged in series with the second fuel cell stack 28. Each of the first and second variable resistors 32, 34 is configured to generate a voltage drop across the respective one of the paths 27, 29. Each of the variable resistors 32, 34 can be a conventional variable resistor, a potentiometer or another suitable device as is known in the art. In other examples, the regulation assembly 31 includes only one of the first and second variable resistors 32, 34. In this arrangement, operating only one variable resistor can result in a reduction of power consumption by the variable resistor, and in particular by positioning the variable resistor in series with a fuel cell stack optimized for a relatively low power range, thereby increasing the overall efficiency of the fuel cell assembly 18. Also, the variable resistors 32, 34 can be electrically positioned before or after the respective one of the first and second fuel cell stacks 26, 28.

In some examples, the regulation assembly 31 includes a conventional switch or contactor 36 arranged in series with the second fuel cell stack 28 and the second variable resistor 34. The contactor 36 is operable to selectively deactivate or electrically decouple the second fuel cell stack 28 from the load 11 by opening the second path 29. The contactor 36 prevents current flow back into the second fuel cell stack 28, which can result in degradation of the fuel cells 19. In other examples, the contactor 36 can be arranged in series with the first fuel cell stack 26 and the first variable resistor 32 to selectively deactivate or electrically isolate the first fuel cell stack 26.

The contactor 36 is configured to open and close in response to a command signal generated by the controller 24 via a command line 42. In some examples, the first fuel cell stack 26 provides power to the load 11 in a low power mode and the combination of the first and second fuel cell stacks 26, 28 provide power to the load 11 when the contactor 36 is in a closed or deactivated state. In other examples, the contactor 36 is a conventional diode or another conventional component configured to electrically isolate the respective one of the first and second fuel cell stacks 26, 28 from the load 11.

The controller 24 is operable to control a present or instantaneous resistance level of the first variable resistor 32 and the second variable resistor 34. The controller 24 provides a resistance control signal to the first variable resistor 32 via a first control signal line 38. In examples which include the second variable resistor 34, the controller 24 provides a resistance control signal to the second variable resistor 34 via a second control signal line 40. The resistance control signal corresponds to a desired resistance level of at least one of the first and second variable resistors 32, 34. In some examples, the resistance control signal is a discrete signal being either a low value or a high value. In one example, the low value corresponds to about 0 ohms (Ω) and the high value corresponds to a value greater than about 0 ohms (Ω). In other examples, the resistance control signal includes one of a range of values corresponding to the desired resistance level. One of ordinary skill in the art can determine suitable values based upon operating and design constraints of the fuel cell assembly 18 and the teachings disclosed herein.

The controller 24 can adjust the resistance level of the variable resistors 32, 34 in response to one or more conditions of the fuel cell assembly 18. In some examples, the controller 24 adjusts the resistance level of the variable resistors 32, 34 in response to deactivating the contactor 36. In some fuel cell arrangements, each fuel cell 19 is characterized by a nonlinear rate of current output with respect to an instantaneous voltage, known by those of ordinary skill in the art as a power curve characteristic. Accordingly, the first fuel cell stack 26 may generate power at a different voltage level when the second fuel cell stack 28 is in an activated state than when the second fuel cell stack 28 is in a deactivated state, based upon the current provided to the load 11. Therefore, it may be desirable for the controller 24 to command the first variable resistor 32 to increase the resistance level of the first variable resistor 32 when the second fuel cell stack 28 is in a deactivated state, thereby maintaining the voltage level across the load 11 within the single desired voltage range.

In other examples, the controller 24 adjusts the resistance level of the variable resistors 32, 34 in response to a voltage level at various points in the circuitry of the fuel cell assembly 18. In one example, the regulation assembly 31 includes a first voltmeter 50, a second voltmeter 52 and a third voltmeter 54 each configured to provide an instantaneous voltage measurement to the controller 24 via a plurality of voltage communications lines 56. The controller 24 receives a voltage level across the load 11 via the first voltmeter 50, a voltage level across the first fuel cell stack 26 via the second voltmeter 52, and a voltage level across the second fuel cell stack 28 via the third voltmeter 54. The controller 24 can adjust the resistance level of the variable resistors 32, 34 in response to a change in the present voltage measured across the load 11 or stacks 26, 28 within one of the power levels or as a result of the load 11 transitioning between the low power mode and the high power mode. In other examples, the controller 24 is operable to directly measure the voltage level across the load 11 and the first and second fuel cell stacks 26, 28.

In yet other examples, the controller 24 adjusts the resistance level of the variable resistors 32, 34 in response to a current level at various points in the circuitry of the fuel cell assembly 18. In one example, the regulation assembly 31 includes a first amperage meter 58 and a second amperage meter 60 each configured to provide an instantaneous current measurement to the controller 24 via a plurality of current communications lines 62. The controller 24 receives a current level within the first path 27 via the first amperage meter 58 and a current level within the second path 29 via the second amperage meter 60, with the total current provided to the load 11 through a third path 61 being a sum of the current in the first and second paths 27, 29. In one example, the resistance level of the first variable resistor 32 is adjusted based upon a present current level of the first fuel cell stack 26. In another example, the resistance level of the second variable resistor 34 is adjusted based upon a present current of the second fuel cell stack 28. In other examples, the controller 24 is operable to directly measure the current level in each of the first and second paths 27, 29.

In further examples, the fuel cell assembly 18 is configured to provide current to the load 11 at a predetermined ratio of a current of a first fuel cell stack 26 to a current of a second fuel cell stack 28. The resistance level of the first and second variable resistors 32, 34 can be adjusted to maintain the predetermined ratio within the single desired voltage range. Maintaining the predetermined ratio can result in minimizing the likelihood of reactant maldistribution or fuel starvation due to at least one of the first and second fuel cell stacks 26, 28 receiving an insufficient amount of reactant to meet the power demands of the load 11. Reactant maldistribution can result in fuel cell degradation due to corrosion of the fuel cells 19 and can also lead to performance instability.

In some examples, the controller 24 regulates or meters the flow of fuel and/or oxidant provided by the fuel and oxidant sources 20, 22 to the second fuel cell stack 28. The controller 24 provides a valve control signal via a valve activation line 44 to a fuel valve 46 and/or an oxidant valve 48 to meter fuel and/or oxidant provided to the second fuel cell stack 28 when in an activated state. In some examples, each of the valves 46, 48 is moveable between a fully open and a fully closed position during a transition between each of the power levels of the fuel cell assembly 18. In other examples, each of the valves 46, 48 is variable across a range of positions and can be adjusted within one of the power levels of the fuel cell assembly 18. In this arrangement, the current of each of the fuel cell stacks 26, 28 can be controlled with the reactant flow rates to prevent reactant starvation and increase the overall efficiency of the fuel cell assembly 18 by minimizing reactant consumption.

Figure 3:
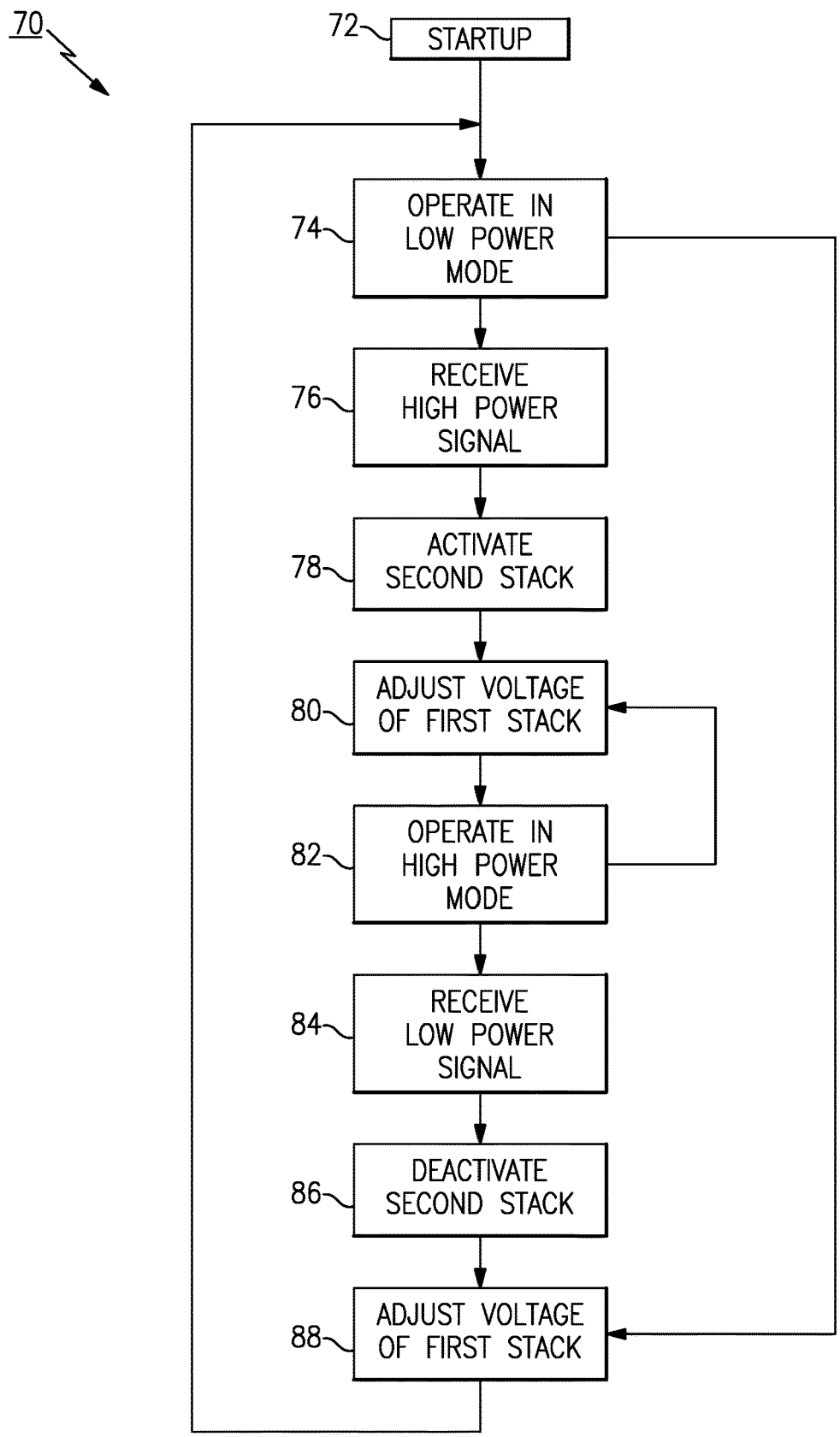
FIG. 3 is an example process for regulating a fuel cell assembly.

FIG. 3 illustrates an example process of operating the fuel cell assembly 18. The electric vehicle 10 is initialized via a start-up sequence at step 72. The fuel cell assembly 18 operates in the low power mode at step 74. Alternatively, the fuel cell assembly 18 can begin operating in high power mode at step 82. The controller 24 receives a high power signal at step 76. In some examples, the high power signal is based upon a voltage level and/or a current level at one or more points in the circuitry of the fuel cell assembly 18, as previously described. In other examples, the high power signal is generated by another system of the electric vehicle 10 and provided to the controller 24. The controller 24 activates the second fuel cell stack 28 by closing the contactor 36 at step 78. In some examples, step 78 includes activation of the second fuel cell stack 28 by opening the fuel valve 46 and/or the oxidant valve 48.

At step 80 the voltage of the first fuel cell stack 26 is adjusted by changing the resistance level of the first variable resistor 32. In some examples, the resistance level of the first variable resistor 32 increases, thereby creating a voltage drop across the first path 27 of the first fuel cell stack 26 to maintain the voltage level across the load 11 within the single desired voltage range. In some examples, the resistance level of the first variable resistor 32 is adjusted simultaneously with closing the contactor 36. Thereafter, the fuel cell assembly 18 begins to operate in the high power mode within the single desired voltage range at step 82.

Upon receiving a low power signal, the controller 24 deactivates the second fuel cell stack 28 by opening the contactor 36 to electrically open the second path 29 at step 86. In some examples, step 86 includes deactivation of the second fuel cell stack 28 by at least partially closing the fuel valve 46 and/or the oxidant valve 48. In some examples, the low power signal is based upon a voltage level and/or a current level at one or more points in the circuitry of the fuel cell assembly 18, as previously described. In other examples, the low power signal is generated by another system of the electric vehicle 10 and provided to the controller 24. At step 88 the voltage of the first fuel cell stack 26 is adjusted by changing the resistance level of the first variable resistor 32. In some examples, the resistance level of the first variable resistor 32 decreases to maintain the voltage level across the load 11 within the single desired voltage range. In some examples, the resistance level of the first variable resistor 32 is adjusted simultaneously with opening the contactor 36.

The present voltage level of either of the first and second fuel cell stacks 26, 28 can fluctuate due to changes in operating conditions of the fuel cell assembly 18. In some examples, the resistance level of each of the first and second variable resistors 32, 34 can be adjusted by the controller 24 to maintain the desired voltage range across the load 11 within each of the low and high power modes.

The example fuel cell assembly 18 includes many benefits over conventional fuel cell assemblies. One benefit includes providing power to the load 11 within the single desired voltage range, thereby minimizing the risk of degradation or damage of various electric components of the load 11. Another benefit is the elimination of sophisticated power conditioning circuitry, resulting in a reduction in power consumption and packaging requirements. Additionally, each of the fuel cell stacks 26, 28 can operate in parallel with a lower likelihood of fuel starvation, and thus, the risk of failure of either of the fuel cell stacks 26, 28 due to corrosion and other undesirable operating conditions is minimized The fuel cell stacks 26, 28 can also operate in parallel with each other at slightly different voltage ranges. The fuel cell assembly 18 can also maintain a desired current distribution between the fuel cell stacks based upon a particular reactant and/or oxidant flow distribution.

The resistance level of each variable resistor of the fuel cell assembly 18 can be adjusted to account for changes in stack degradation or decay over time due to catalyst consumption and other conditions caused by recoverable and non-recoverable performance losses and other performance instabilities. The stacks 26, 28 can decay at different rates due to operating each of the stacks 26, 28 for different periods of time and at different power levels. The resistance level of each variable resistor can be adjusted to account for recoverable performance losses to account for the present characteristics of the fuel cells 19.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of regulating a fuel cell assembly, comprising:
   generating a high power in a high power range using a first fuel cell stack and a second fuel cell stack in parallel with each other;
   generating a low power in a low power range using said first fuel cell stack, said second fuel cell stack being deactivated in said low power range;
   wherein a resistance within a path defined by said first fuel cell stack changes in response to transitioning between said low and high power ranges, thereby maintaining said low power and said high power within a single voltage range;
   wherein said path includes said first fuel cell stack in series with a variable resistor, said variable resistor in parallel with said second fuel cell stack;
   wherein said second fuel cell stack is arranged in series with a contractor; and
   adjusting a resistance level of said variable resistor in response to deactivating said contractor.

2. The method as recited in claim 1, wherein said variable resistor is a potentiometer.

3. The method as recited in claim 1, further comprising adjusting a present resistance of said variable resistor based upon a present voltage of said first fuel cell stack.

4. The method as recited in claim 1, further comprising adjusting a present resistance of said variable resistor based upon a present current of said first fuel cell stack.

5. The method as recited in claim 4, wherein said first and second fuel cell stacks are configured to provide current to a load at a predetermined ratio of a current of said first fuel cell stack to a current of said second fuel cell stack.

6. The method as recited in claim 1, further comprising minimizing flow of at least one of reactant and oxidant to said second fuel cell stack by generating power in said low power range.

7. The method as recited in claim 6, wherein said second fuel cell stack is arranged in series with a contactor.

8. The method as recited in claim 1, wherein said resistance is dependent on an instantaneous voltage of said first fuel cell stack.

9. The method as recited in claim 1, wherein said resistance is dependent on an instantaneous current within said path.

10. The method as recited in claim 5, wherein:
    the load includes a first load and a second load, the first load is an electric motor configured to rotate a propeller, and the second load includes an electronics payload, the electronics payload including communications equipment and one or more sensors.

11. The method as recited in claim 10, wherein said high power range corresponds to a high power mode, and said low power range corresponds to a low power mode, and further comprising operating the electric motor in said high power mode but not in said low power mode.

12. A methond of regulating a fuel cell assembly, comprising:
    generating a high power in a high power range using a first fuel cell stack and a second fuel cell stack in parallel with each other;
    generating a low power in a low power range using said first fuel cell stack, said second fuel cell stack being deactivated in said low power range;
    wherein a resistance within a path defined by said first fuel cell stack changes in response to transitioning between said low and high power ranges, thereby maintaining said low power and said high power within a single voltage range;
    wherein said path includes said first fuel cell stack in series with a variable resistor, said variable resistor in parallel with said second fuel cell stack;
    adjusting a present resistance of said variable resistor based upon a present current of said first fuel cell stack;
    wherein said first and second fuel cell stacks are configured to provide current to a load at a predetermined ratio of a current of said first fuel cell stack to a current of said second fuel cell stack; and
    wherein the load includes a first load and a second load, the first load is an electric motor configured to rotate a propeller, and the second load includes an electronics payload, the electronics payload including communications equipment and one or more sensors.

13. The method as recited in claim 12, wherein said high power range corresponds to a high power mode, and said low power range corresponds to a low power mode, and further comprising operating the electric motor in said high power mode but not in said low power mode.

14. The method as recited in claim 13, further comprising operating the electronics payload in said low power mode, and operating the electronics payload in said high power mode.

15. The method as recited in claim 14, wherein said second fuel cell stack is arranged in series with a contactor, and further comprising adjusting a resistance level of said variable resistor in response to deactivating said contactor.

16. The method as recited in claim 15, wherein said low power range is approximately 0.7 kilowatts, said high power range is approximately 37.0 kilowatts, and said single voltage range is approximately 250.0 volts.

17. The method as recited in claim 16, wherein each of the first and second fuel cell stacks includes a plurality of fuel cells, and each fuel cell of said plurality of fuel cells includes a proton exchange membrane.

18. A method of regulating a fuel cell assembly, comprising:
    generating a high power in a high power range using a first fuel cell stack and a second fuel cell stack in parallel with each other;
    generating a low power in a low power range using said first fuel cell stack, said second fuel cell stack being deactivated in said low power range; and p1 wherein a resistance within a path defined by said first fuel cell stack changes in response to transitioning between said low and high power ranges, thereby maintaining said low power and said high power within a single voltage range;
    minimizing flow of at least one of reactant and oxidant to said second fuel cell stack by generating power in said low power range;
    wherein said second fuel cell stack is arranged in series with a contractor; and
    wherein said path includes said first fuel cell stack in series with a variable resistor, and further comprising adjusting a resistance level of said variable resistor in response to deactivating said contactor.

19. The method as recited in claim 18, further comprising at least partially closing a valve to reduce the flow of said at least one of reactant and oxidant to said second fuel cell stack when said contactor is in a deactivated state.

20. The method as recited in claim 18, wherein:
said first and second fuel cell stacks are configured to provide current to a load at a predetermined ratio of a current of said first fuel cell stack to a current of said second fuel cell stack; and
the load includes a first load and a second load, the first load is an electric motor configured to rotate a propeller, and the second load includes an electronics payload, the electronics payload including communications equipment and one or more sensors.

* * * * *